United States Patent [19]

Ezekoye et al.

[11] Patent Number: 4,716,005
[45] Date of Patent: Dec. 29, 1987

[54] FORMING A SEAL BETWEEN PLANAR SEALING SURFACES

[75] Inventors: L. Ike Ezekoye, Wilkinsburg; Edward J. Rusnica, Greensburg; Henry A. Sepp, Jr., Monroeville Boro, all of Pa.

[73] Assignee: Westinghouse Electric Corp., Pittsburgh, Pa.

[21] Appl. No.: 820,356

[22] Filed: Jan. 21, 1986

[51] Int. Cl.<sup>4</sup> .............................. G21C 13/00
[52] U.S. Cl. .................... 376/205; 220/378; 277/157; 277/180; 277/189
[58] Field of Search ............ 376/205, 203, 206; 220/327, 378; 277/138, 157, 158, 180, 181, 184, 186, 189, 101

[56] References Cited

U.S. PATENT DOCUMENTS

| 2,872,229 | 2/1959 | Waser | 277/184 |
|---|---|---|---|
| 3,276,619 | 10/1966 | Scholz | 220/378 |
| 3,561,793 | 2/1971 | Rode | 277/180 |
| 3,669,303 | 6/1972 | Launay | 376/205 |
| 4,069,100 | 1/1978 | Cooper | 376/205 |
| 4,114,898 | 9/1978 | Bainard et al. | 277/189 |
| 4,155,571 | 5/1979 | Gastineau et al. | 277/180 |
| 4,168,853 | 9/1979 | Ahlstone | 277/180 |

FOREIGN PATENT DOCUMENTS

| 833948 | 5/1960 | United Kingdom | 277/101 |
|---|---|---|---|
| 937588 | 9/1963 | United Kingdom | 376/205 |

Primary Examiner—Deborah L. Kyle
Assistant Examiner—Richard L. Klein
Attorney, Agent, or Firm—Daniel C. Abeles

[57] ABSTRACT

A pressure tight seal is formed between the confronting planar sealing surfaces on the flanges of a nuclear reactor pressure vessel and its hemispherical head, by a toroidal, crushable tubular seal member which is locked into a flat annular spacer member by a resilient annular member, such as a circular coil spring seated in a V-shaped recess in the inner surface of the flat annular member. The thickness of the flat annular member and the resiliency of the circular coil spring control the deformation of the tubular seal member as the sealing surfaces are drawn toward each other by flange bolts. The flat annular member is provided with axial bores which register with the flange bolts to provide positive positioning of the tubular seal member without the necessity of providing grooves in the confronting planar sealing surfaces.

12 Claims, 4 Drawing Figures

FORMING A SEAL BETWEEN PLANAR SEALING SURFACES

BACKGROUND OF THE INVENTION

1. Field of the Invention

This invention relates to devices and a method for forming a pressure seal between two planar sealing surfaces and more particularly to such a device and method which include a toroidal, crushable seal member and a spacer unit for positioning the seal member between the planar sealing surfaces and for controlling the deformation of the seal member as it is crushed between the sealing surfaces.

2. Prior Art

There are many types of equipment which require the formation of a pressure tight seal between confronting planar sealing surfaces. Such equipment includes, for example, pump housings, high pressure fluid conduits, and pressure vessels. Often the confronting planar sealing surfaces are formed on annular flanges which are bolted together. It is common practice to use organic or inorganic gaskets or "O" rings to form such seals and to provide annular grooves in one or both of the confronting planar sealing surfaces to position the seal member. There is a tendency in many such installations for the flanges to bend about the pivot formed by the edge of the gasket or the "O" ring.

One type of installation in which a pressure tight seal is required between confronting planar sealing surfaces is the pressure vessel of a nuclear reactor. The upright cylindrical pressure vessel terminates at its upper end in a radially outwardly extending flange to which is bolted a complimentary flange on the hemispherical vessel head. In order to provide a seal to withstand the two to three thousand psi pressures developed in the pressure vessel with adequate safety margins, a crushable, tubular, metallic torus is typically inserted between the flanges. As the bolts are tightened to draw the flanges toward each other, the crushable tubular metallic torus is deformed to form the pressure tight seal. Annular grooves in the flanges position the torrus and prevent it from slipping as the bolts are tightened. Holes in the inner surface of the tubular torrus, admit reactor coolant into the tubular seal to pressurize it.

SUMMARY OF THE INVENTION

In accordance with the invention, a sealing assembly and a method for forming a seal between confronting annular, planar sealing surfaces include a toroidal, crushable seal member and an annular spacer unit having a resilient annular inner portion with an inner diameter smaller than the outer diameter of the seal member which surrounds the seal member and positions it between the sealing surfaces. The resilient portion of the spacer unit also applies uniform resistance to the periphery of the seal member as it is being crushed between the sealing surfaces so that the seal member remains centered as it is deformed and expands radially. The spacer unit is thinner than the crushable seal member so that it can be used to set the distance that the crushable seal member is axially compressed. Preferably, the spacer unit includes a substantially rigid, flat annular member so that the sealing surfaces can be clamped down firmly on the spacer unit. Where the sealing surfaces are drawn together by elongated fasteners, the spacer unit engages these fasteners to fix the lateral position of the seal member. Preferably, the elongated fasteners pass through axial bores in the flat annular member of the spacer unit.

Also preferably, the flat annular member has a radially extending annular recess in its inner surface in which the resilient portion of the spacer unit, in the form of an annular resilient member, is seated. In the specific embodiment of the invention disclosed, this recess is V-shaped and the annular resilient member is a toroidal coil spring. The preferred seal member is a toroidal, metallic tubular member with radial holes in the inner surface through which the seal may be pressurized.

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

The invention will be described as applied to a pressure vessel in a nuclear reactor, however, it will be realized by those skilled in the art that it has wider application to a great many installations where it is desired to form a pressure tight seal between two planar sealing surfaces. Thus, by way of examples which are not meant to be limiting, the invention could also be utilized to provide a pressure tight seal for pump housings, fluid conduits and other types of pressure vessels.

Figure 1:
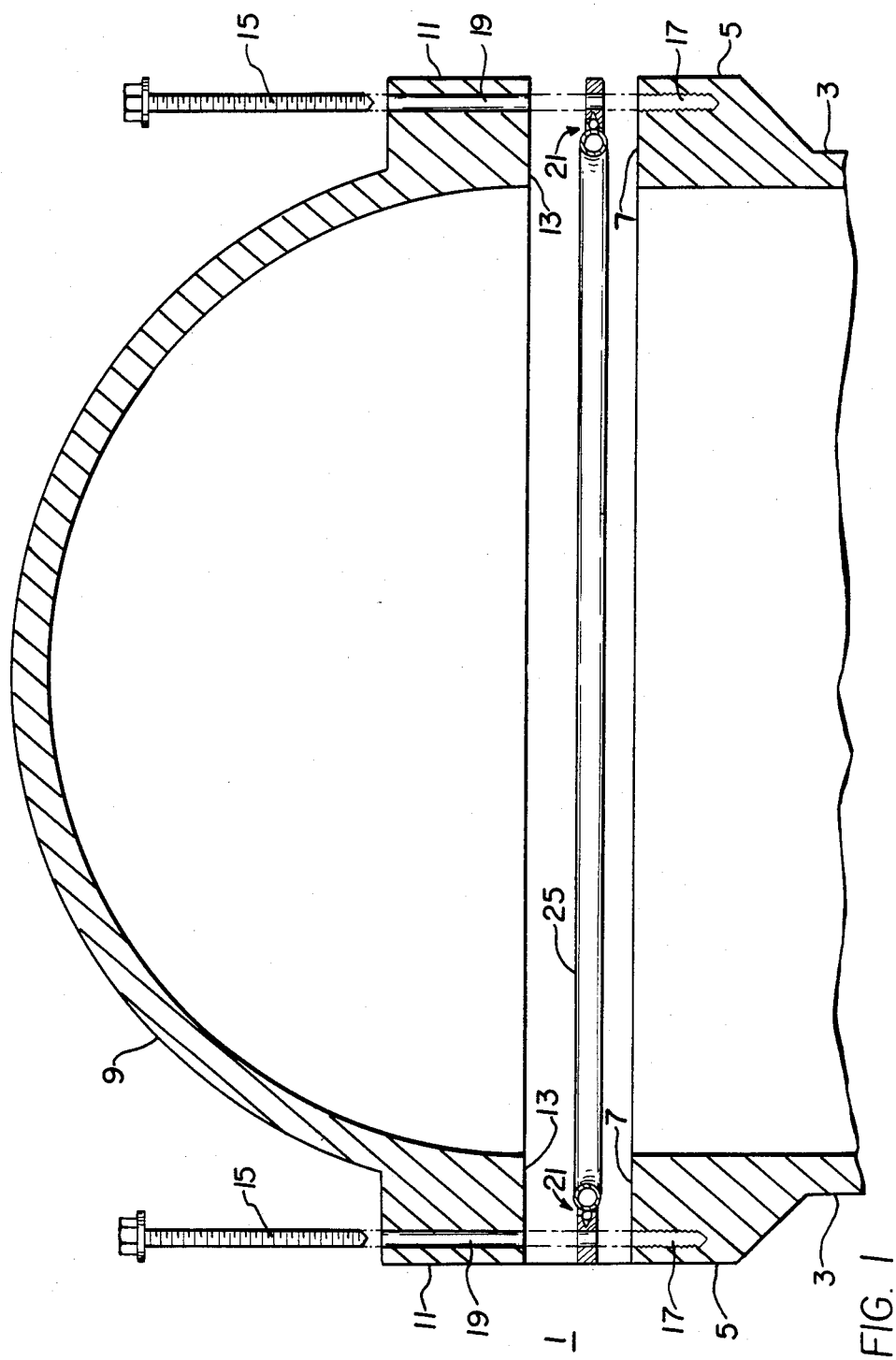
FIG. 1 is an exploded view in vertical section through a nuclear reactor pressure vessel incorporating the invention.

As illustrated in FIG. 1, the nuclear reactor pressure vessel 1 in connection with which the invention will be described, includes an upright cylindrical body 3 having a radially, outwardly extending flange 5 at its upper end which defines an axially facing planar sealing surface 7. A removable, hemispherical head 9 terminates at its lower end in a mating, radially extending flange 11 which also defines an axially facing sealing surface 13. The head 9 is secured to the pressure vessel body 3 by a number of bolts 15 which extend through bores 17 and 19 in flanges 5 and 11 respectively.

Figure 2:
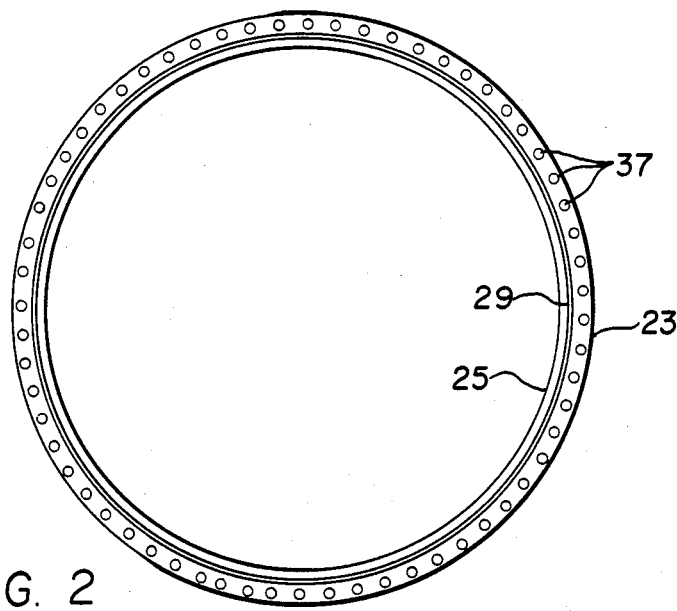
FIG. 2 is a plan view of a sealing assembly according to the invention.
Figure 3:
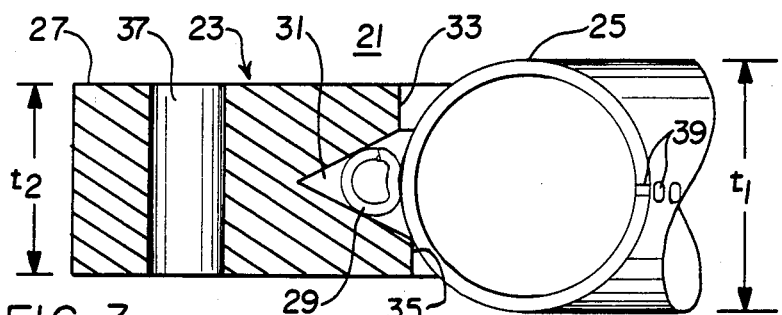
FIG. 3 is an enlarged vertical sectional view through the seal assembly of FIG. 2 taken along the line 3—3.

Under normal operating conditions, reactor coolant is introduced into the pressure vessel 1 at a pressure between 2000 and 3000 psi. In accordance with the invention, a seal assembly 21 provides a pressure tight seal between the confronting sealing surfaces 7 and 13 on the flanges 5 and 11. As can best be seen from FIGS. 2 and 3, the seal assembly 21 includes a spacer unit 23 and a toroidal, crushable seal member 25. The spacer unit 23 includes a flat, ring shaped member 27 with a resilient inner portion which is formed by a circular coil spring 29 seated in a radially extending V-shaped recess 31 in the inner surface formed by the bore 33 of the ring shaped member. Alternatively, an elastomeric solid or hollow O-ring can be used in place of the circular coil spring 29. The toroidal, crushable seal member 25 is a circular metallic tube which is received in the bore 33 in the ring shaped member 27 and rests on a shoulder 35. The seal member 25 is locked in place within the ring-shaped member 27 by the circular coil spring 29 so that the seal assembly 21 can be maneuvered as a unit. This greatly facilitates alignment of the seal and is an important feature of the invention.

Figure 4:
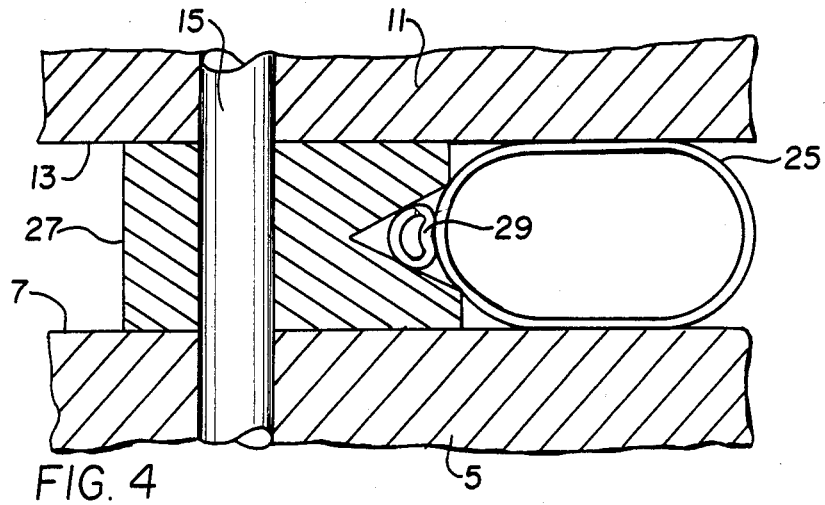
FIG. 4 is a sectional view similar to that of FIG. 3 showing the seal assembly as installed in the nuclear reactor pressure vessel of FIG. 1.

The ring-shaped member 27 is provided with a number of axial bores 37 which register with the flange bores 17 and 19 to positively locate the seal assembly 21 between the sealing surfaces 7 and 13. The thickness $t_1$ of the seal member 25 is greater than the thickness $t_2$ of the ring-shaped member 27, so that as the bolts 15 are tightened to draw the sealing surfaces 7 and 13 toward each other the seal member 25 is contacted first and crushed betwen the sealing surfaces. As this occurs, the seal member 25 flattens out against the sealing surfaces 7 and 13 as shown in FIG. 4 to form an in depth seal. The spacer unit 23 maintains the proper position of the seal member 25 while it is being crushed yet the resiliency of the circular coil spring 29 permits it to expand radially as it is deformed. Preferably, the ring-shaped member 27 is made of a rigid material such as steel so that its thickness, $t_2$, provides a positive limit for the crushing of the seal member 25. The tubular seal member 25 is provided with radial bores 39 along its inner surface to admit pressurized reactor coolant into the interior of the seal member to improve its sealing capability.

The alignment of the toroidal seal member 25 relative to the planar sealing surfaces 7 and 13 without the necessity of cutting grooves in, or providing other special arrangements on the planar sealing surfaces, is another important feature of the invention.

By way of example, a typical seal unit made in accordance with the teachings of the invention for use in sealing the head on a nuclear reactor pressure vessel includes an annular 160.822 inch O.D. seal member 25, made of 0.5 inch O.D. tubular stainless steel material with a 0.050 inch wall thickness and 0.06 to 0.07 inch apertures 39 and coated with a 0.001 to 0.002 layer of silver to fill in machining imperfections. The spacer unit 23 includes a flat 0.473 inch thick ring member 27 having a 184 inch O.D. and a 160.54 inch I.D., and a solid annular 161.35 inch O.D. resilient member 29 made of 0.25 inch elastomeric material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of forming a seal between the confronting planar sealing surfaces on two annular structural members which are drawn together by axially extending bolts comprising the steps of:
    forming a seal assembly by locking a toroidal, crushable seal member within a substantially flat annular spacer member against an annular shoulder formed on the inner diameter thereof with an annular resilient member seated in a radially extending groove in the inner surface of said substantially flat annular member, said flat annular member being axially thinner than said toroidal, crushable seal member;
    placing said sealing assembly between said planar sealing surfaces and positively aligning said assembly relative to said axially extending bolts; and
    tightening said bolts to draw said planar sealing surfaces toward each other and into contact with the flat annular member while crushing said toroidal, crushable seal member to form a seal between said planar sealing surfaces.

2. A sealing assembly for providing a seal between confronting planar sealing surfaces on two annular structural members which are drawn toward each other by securing means; said sealing assembly comprising:
    a toroidal, crushable seal member;
    a flat annular spacer member surrounding said toroidal, crushable seal member and defining an annular shoulder on the inner diameter thereof on which said toroidal, crushable seal member seats, said flat annular spacer member further defining a radially extending annular recess on its inner surface, and
    an annular resilient member seated in said annular recess and bearing against said toroidal, crushable seal member to center the toroidal, crushable seal member within the flat annular spacer member and resiliently lock the toroidal, crushable seal member against said shoulder while permitting the seal member to expand radially as it is crushed by the drawing of the planar surfaces on said structural members toward each other by the securing means, the thickness of said flat annular spacer member being less than that of said toroidal, crushable seal member to set the distance that the planar surfaces are drawn toward each other, and therefore provide uniform crushing of the toroidal, crushable seal member.

3. The sealing assembly of claim 2 wherein said flat annular member defines means which engage the securing means to positively position said flat annular spacer member and therefore also said toroidal, crushable seal member between said planar sealing surfaces.

4. The sealing assembly of claim 3 wherein said securing means comprises elongated fasteners passing through said structural members including said sealing surfaces and wherein said flat annular spacer member defines passages through which said elongated fasteners pass to positively position said spacer member and therefore siad toroidal, crushable seal member relative to said structural members.

5. The seal assembly of claim 4 wherein said radially extending annular recess in said flat annular member is V-shaped.

6. The seal assembly of claim 5 wherein said annular resilient member is a toroidal coil spring.

7. The seal assembly of claim 6 wherein said toroidal, crushable seal member is a metallic tubular member.

8. The seal assembly of claim 7 wherein said structural members define a fluid pressure chamber and wherein said metallic, tubular seal member defines radial bores on its inner surface which communicate with the pressure chamber and through which pressurized fluid passes to pressurize the seal member.

9. The sealing assembly of claim 2 wherein said radially extending annular recess is substantially V-shaped and said annular resilient member is a toroidal coil spring.

10. The sealing assembly of claim 9 wherein said toroidal, crushable seal member is a metallic, tubular member.

11. In a nuclear reactor, the combination of a generally, cylindrical pressure vessel having a flange extending radially around its upper end which defines an axially facing planar sealing surface and axially extending bores passing through said sealing surface, a substantially hemispherical head having a radially extending flange around its lower end which defines an axially facing planar sealing surface complementary to the sealing surface on the pressure vessel flange and which also defines axially extending bores aligned with the bores in the pressure vessel flange, bolts passing through the bores in the pressure vessel and head flanges to draw said flanges toward each other, and a sealing assembly comprising:

- a toroidal, crushable metallic, tubular seal member;
- a flat, annular spacer member defining a radially extending V-shaped annular recess in its inner surface and axially extending bores aligned with the bores in said pressure vessel and head flanges through which said bolts pass to position the spacer member relative to said flanges; and
- a toroidal coil spring seated in said V-shaped groove and sized to grip and position said toroidal, crushable metallic tubular seal member inside said flat annular spacer, said flat annular spacer being substantially rigid and axially thinner than said seal member such that as said bolts are tightened to draw said flanges toward each other and down against said spacer member, the seal member is crushed between said planar sealing surfaces to form a seal therebetween.

12. The combination of claim 11 wherein said pressure vessel is pressurized and wherein said toroidal, crushable metallic tubular seal member defines radially extending bores in its inner surface through which said seal member is pressurized by pressure in the pressure vessel.

* * * * *